(12) United States Patent
Davis et al.

(10) Patent No.: US 6,395,364 B1
(45) Date of Patent: May 28, 2002

(54) DATA STORAGE MEDIA CONTAINING CLEAR POLYCARBONATE TERPOLYMER

(75) Inventors: Gary Charles Davis, Albany; Irene Davis; Marc Brian Wisnudel, both of Clifton Park, all of NY (US); Geert Boven, Steenbergen; Jeroen Johannes Cornelis van Ginneken, Tilburg, both of (NL); Christopher David Goewey, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 10 days.

(21) Appl. No.: 09/628,373

(22) Filed: Jul. 31, 2000

(51) Int. Cl.[7] .................................................. B32B 3/02
(52) U.S. Cl. ...................................... 428/64.1; 428/64.7
(58) Field of Search ................................ 428/64.1, 64.2, 428/64.4, 64.7, 913; 430/270.11, 495.1, 945

(56) References Cited

U.S. PATENT DOCUMENTS

| | | | |
|---|---|---|---|
| 6,001,953 A | 12/1999 | Davis et al. | |
| 6,060,577 A | 5/2000 | Davis | ........................ 528/196 |

*Primary Examiner*—Elizabeth Evans
(74) *Attorney, Agent, or Firm*—Robert P. Santandrea; Noreen C. Johnson

(57) ABSTRACT

The invention relates to terpolymers particularly suited for use in high density optical data storage media. The terpolymers are suitable for use in DVD recordable and rewritable media. The invention further relates to methods for making DVD recordable and rewritable media from these terpolymers.

11 Claims, No Drawings

DATA STORAGE MEDIA CONTAINING CLEAR POLYCARBONATE TERPOLYMER

FIELD OF THE INVENTION

This invention relates to polycarbonates suitable for use in high density data storage media, for example DVD recordable and rewritable material. This invention further relates to DVD recordable and rewritable material prepared from these polycarbonates, and methods for making DVD recordable and rewritable materials from these polycarbonates.

BACKGROUND OF THE INVENTION

Polycarbonates and other polymer materials are utilized in optical data storage media, such as compact disks. In optical data storage media, it is critical that polycarbonate resins have good performance characteristics such as transparency, low water affinity, good processibility, good heat resistance and low birefringence. High birefringence is particularly undesirable in high density optical data storage media.

Improvements in optical data storage media, including increased data storage density, are highly desirable, and achievement of such improvements is expected to improve well established and new computer technology such as read only, write once, rewritable, digital versatile and magneto-optical (MO) disks.

In the case of CD-ROM technology, the information to be read is imprinted directly into a moldable, transparent plastic material, such as bisphenol A (BPA) polycarbonate. The information is stored in the form of shallow pits embossed in a polymer surface. The surface is coated with a reflective metallic film, and the digital information, represented by the position and length of the pits, is read optically with a focused low power (5 mW) laser beam. The user can only extract information (digital data) from the disk without changing or adding any data. Thus, it is possible to "read" but not to "write" or "erase" information.

The operating principle in a write once read many (WORM) drive is to use a focused laser beam (20–40 mW) to make a permanent mark on a thin film on a disk. The information is then read out as a change in the optical properties of the disk, e.g., reflectivity or absorbance. These changes can take various forms: "hole burning" is the removal of material, typically a thin film of tellurium, by evaporation, melting or spalling (sometimes referred to as laser ablation); bubble or pit formation involves deformation of the surface, usually of a polymer overcoat of a metal reflector.

Although the CD-ROM and WORM formats have been successfully developed and are well suited for particular applications, the computer industry is focusing on erasable media for optical storage (EODs). There are two types of EODs: phase change (PC) and magneto-optic (MO). In MO storage, a bit of information is stored as a ~1 μm diameter magnetic domain, which has its magnetization either up or down. The information can be read by monitoring the rotation of the plane polarization of light reflected from the surface of the magnetic film. This rotation, called the Magneto-Optic Kerr Effect (MOKE) is typically less than 0.5 degrees. The materials for MO storage are generally amorphous alloys of the rare earth and transition metals.

Amorphous material s have a distinct advantage in MO storage as they do not suffer from "grain noise", spurious variations in the plane of polarization of reflected light caused by randomness in the orientation of grains in a polycrystalline film. Bits are written by heating above the Curie point, $T_c$, and cooling in the presence of a magnetic field, a process known as thermomagnetic writing. In the phase-change material, information is stored in regions that are different phases, typically amorphous and crystalline. These films are usually alloys or compounds of tellurium which can be quenched into the amorphous state by melting and rapidly cooling. The film is initially crystallized by heating it above the crystallization temperature. In most of these materials, the crystallization temperature is close to the glass transition temperature. When the film is heated with a short, high power focused laser pulse, the film can be melted and quenched to the amorphous state. The amorphized spot can represent a digital "1" or a bit of information. The information is read by scanning it with the same laser, set at a lower power, and monitoring the reflectivity.

In the case of WORM and EOD technology, the recording layer is separated from the environment by a transparent, non-interfering shielding layer. Materials selected for such "read through" optical data storage applications must have outstanding physical properties, such as moldability, ductility, a level of robustness compatible with popular use, resistance to deformation when exposed to high heat or high humidity, either alone or in combination. The materials should also interfere minimally with the passage of laser light through the medium when information is being retrieved from or added to the storage device.

As data storage densities are increased in optical data storage media to accommodate newer technologies, such as digital versatile disks (DVD) and higher density data disks for short or long term data archives, the design requirements for the transparent plastic component of the optical data storage devices have become increasingly stringent. In many of these applications, previously employed polycarbonate materials, such as BPA polycarbonate materials, are inadequate. Materials displaying lower birefringence at current, and in the future progressively shorter "reading and writing" wavelengths have been the object of intense efforts in the field of optical data storage devices.

Low birefringence alone will not satisfy all of the design requirements for the use of a material in DVD recordable material and rewritable material; high transparency, heat resistance, low water absorption, ductility, high purity and few inhomogeneities or particulates are also required. Currently employed materials are found to be lacking in one or more of these characteristics, and new materials are needed.

Birefringence in an article molded from polymeric material is related to orientation and deformation of its constituent polymer chains. Birefringence has several sources, including the structure and physical properties of the polymer material, the degree of molecular orientation in the polymer material and thermal stresses in the processed polymer material. For example, the birefringence of a molded optical article is determined, in part, by the molecular structure of its constituent polymer and the processing conditions, such as the forces applied during mold filling and cooling, used in its fabrication which can create thermal stresses and orientation of the polymer chains.

The observed birefringence of a disk is therefore determined by the molecular structure, which determines the intrinsic birefringence, and the processing conditions, which can create thermal stresses and orientation of the polymer chains. Specifically, the observed birefringence is typically a function of the intrinsic birefringence and the birefringence introduced upon molding articles, such as optical disks. The observed birefringence of an optical disk is typically quantified using a measurement termed "in-plane birefringence" or IBR, which is described more fully below.

For a molded optical disk, the IBR is defined as:

$$IBR=(n_r-n_\theta)d=\Delta n_{r\theta}d \quad (3)$$

where $n_r$ and $n_\theta$ are the refractive indices along the r and θ cylindrical axes of the disk; $n_r$ is the index of refraction seen by a light beam polarized along the radial direction, and $n_\theta$ is the index of refraction for light polarized azimuthally to the plane of the disk. The thickness of the disk is given by d. The IBR governs the defocusing margin, and reduction of IBR will lead to the alleviation of problems which are not correctable mechanically. IBR is a property of the finished optical disk. It is formally called a "retardation" and has units of nanometers.

In applications requiring higher storage density, such as DVD recordable and rewritable material, the properties of low birefringence and low water absorption in the polymer material from which the optical article is fabricated become even more critical. In order to achieve higher data storage density, low birefringence is necessary so as to minimally interfere with the laser beam as it passes through the optical article, for example a compact disk.

Materials for DVD recordable and rewritable material require low in-plane birefringence, in particular preferably less than about +/−40 nm single pass; excellent replication of the grooved structure, in particular greater than about 90% of stamper; and reduced water uptake as compared to BPA polycarbonate.

Another critical property needed for high data storage density applications, in particular DVD recordable and rewritable material, is disk flatness. The disk flatness is dependent upon the flatness of the polycarbonate substrate immediately after the injection molding process as well as the dimensional stability of the substrate upon exposure to high humidity environments. It is known that excessive moisture absorption results in disk skewing which in turn leads to reduced reliability. Since the bulk of the disk is comprised of the polymer material, the flatness of the disk depends on the low water solubility and low rate of water diffusion into the polymeric material. In addition, the polymer should be easily processed in order to product high quality disks through injection molding.

There exists a need for compositions having good optical properties and good processibility and which are suitable for use in high density optical data storage media, in particular DVD recordable and rewritable material. Polycarbonates manufactured by copolymerizing the aforementioned aromatic dihydroxy compounds, such as bisphenol A, with other monomers, such as SBI, may produce acceptable birefringence; however the glass transition temperature and melt viscosity is often too high, resulting in poor processing characteristics. Consequently, the obtained moldings have low impact resistance and low pit replication. Further, the water absorption of such polycarbonates is unacceptable for higher density applications.

BRIEF SUMMARY OF THE INVENTION

The present invention solves these problems, and provides further surprising properties. These and further objects of the invention will be more readily appreciated when considering the following disclosure and appended claims.

In one aspect, the invention relates to materials suitable for use in high density data storage media comprising a terpolymer, the terpolymer comprising:

A) carbonate structural units corresponding to structure (I)

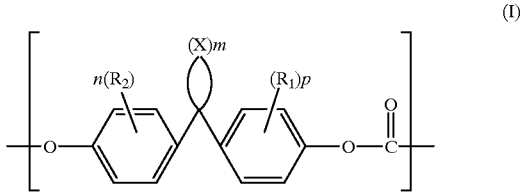

where
- $R_1$ and $R_2$ are independently selected from the group consisting of $C_1-C_6$ alkyl;
- X represents $CH_2$;
- m is an integer from 4 to 7;
- n is an integer from 1 to 4; and
- p is an integer from 1 to 4
- with the proviso that at least one of $R_1$ or $R_2$ is in the 3 or 3' position; and wherein the structural units of formula (I) comprise from 20 to 80, more preferably from about 40 to about 60 mole % of the terpolymer;

B) carbonate structural units corresponding to structure (II)

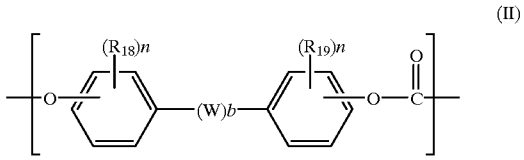

where
- $R_{18}$ is independently selected from the group consisting of halogen, hydrogen, monovalent $C_1-C_6$ hydrocarbon, monovalent $C_1-C_6$ hydrocarbonoxy radicals,
- $R_{19}$ is independently selected from the group consisting of halogen, hydrogen, monovalent $C_1-C_6$ hydrocarbon, and monovalent $C_1-C_6$ hydrocarbonoxy radicals;
- W is selected from the group consisting of substituted or unsubstituted divalent $C_1-C_{18}$ hydrocarbon radicals, —S—, —S—S—, —O—,

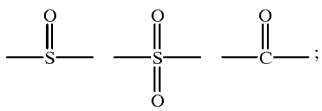

- each n is independently selected from integers having a value of from 0 to 4 inclusive; and b is zero or one; wherein the structural units (II) comprise from from about 20 to about 80, preferably from about 40 to about 60 mole % of the terpolymer; and C) structural units corresponding to structure (V)

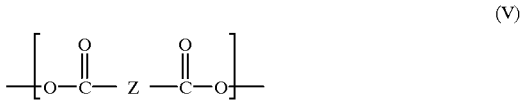

wherein Z is a $C_1-C_{40}$ branched or unbranched alkyl or branched or unbranched cycloalkyl and wherein the structural units of formula (V) comprise from about 0.5 to about 10 mole % of the terpolymer. The terpolymer preferably has a glass transition temperature Tg of from about 120° C. to about 185° C. and a water absorption below about 0.33.

In a further aspect, this invention relates to high density data storage media having both a data storage layer and an adjacent transparent overlayer wherein the data storage layer is capable of reflecting an energy field incident upon said transparent overlayer prior to being incident upon said data layer. Specifically, this aspect of the invention relates to data storage media having thin transparent overlayers of the defined miscible clear blend composition. As mentioned, DVDs are data storage media. The DVD typically has two substrates, each about 120 mm in radius and only about 0.6 mm thick. These substrates are bonded together to make a double-sided optical medium.

The invention further relates to methods of making data storage media from these clear blend compositions. In one embodiment of this invention, structure (I) is a residue 1,1-bis(4-hydroxy-3-methyl phenyl)cyclohexane (BCC), structure (II) is a residue of BPA and structure (III) is a residue of DDDA.

DETAILED DESCRIPTION OF THE INVENTION

The present invention may be understood more readily by reference to the following detailed description of preferred embodiments of the invention and the Examples included therein.

Before the present compositions of matter and methods are disclosed, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms "a," "an" and "the" include plural referents unless the context clearly dictates otherwise.

"Optional" or "optionally" means that the subsequently described event or circumstances may or may not occur, and that description includes instances where the event or circumstance occurs and instances where it does not.

"BPA" is herein defined as bisphenol A or 2,2-bis(4-hydroxyphenyl)propane.

"BCC" is herein defined as 1,1-bis(4-hydroxy-3-methyl phenyl)cyclohexane.

"Polycarbonate" or "polycarbonates" as used herein includes copolycarbonates, homopolycarbonates and (co)polyester carbonates.

"DVD recordable and rewritable media" as used herein includes DVD-RW, DVD+RW, DVD-Ram, and write once DVD recordable (DVD-R).

"High Density" as used herein means having an areal density greater than about four times that of a standard CD (standard CD; 640 megabytes, about 120 millimeter diameter)

Unless otherwise stated, "mol %" in reference to the composition of a polycarbonate in this specification is based upon 100 mol % of the repeating units of the polycarbonate. For instance, "a polycarbonate comprising 90 mol % of BCC" refers to a polycarbonate in which 90 mol % of the repeating units are residues derived from BCC diphenol or its corresponding derivative(s). Corresponding derivatives include but are not limited to, corresponding oligomers of the diphenols; corresponding esters of the diphenol and their oligomers; and the corresponding chloroformates of the diphenol and their oligomers.

The terms "residues" and "structural units", used in reference to the constituents of the polycarbonate, are synonymous throughout the specification.

Throughout this application where publications are referenced, the disclosures of these publications in their entireties are hereby incorporated by reference into this application in order to more fully describe the state of the art to which this invention pertains.

As mentioned, in one aspect, this invention relates to high density data storage media comprising a terpolymer, the terpolymer comprising:

A) carbonate structural units corresponding to structure (I)

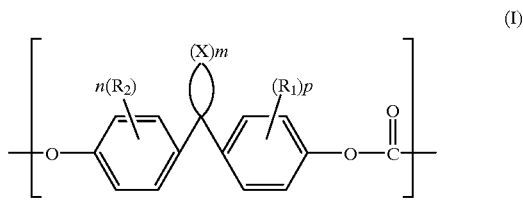

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from about 20 to about 80, preferably from about 40 to about 60 mole % of the terpolymer;

B) carbonate structural units corresponding to structure (II)

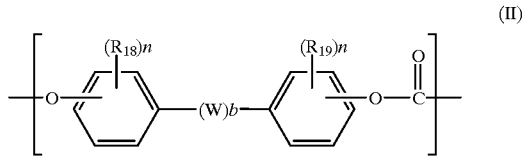

where $R_{18}$ is independently selected from the group consisting of halogen, hydrogen, monovalent $C_1$–$C_6$ hydrocarbon, monovalent $C_1$–$C_6$ hydrocarbonoxy radicals, $R_{19}$ is independently selected from the group consisting of halogen, hydrogen, monovalent $C_1$–$C_6$ hydrocarbon, and monovalent $C_1$–$C_6$ hydrocarbonoxy radicals;

W is selected from the group consisting of substituted or unsubstituted divalent $C_1$–$C_{18}$ hydrocarbon radicals,

—S—, —S—S—, —O—,

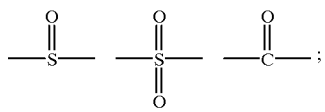

each n is independently selected from integers having a value of from 0 to 4 inclusive; and b is zero or one; wherein the structural units (II) comprise from about 20 to about 80, preferably from about 40 to about 60 mole % of the terpolymer; and C) structural units corresponding to structure (V)

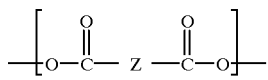

(V)

wherein Z is a $C_1$–$C_{40}$ branched or unbranched alkyl or branched or unbranched cycloalkyl and wherein the structural units of formula (V) comprise from about 0.5 to about 10 mole % of the terpolymer The applicants were surprised to discover that the terpolymer of the present invention has properties particularly suitable for use in high density data storage media, in particular DVD recordable and rewritable material, including low in plane birefringence (preferably less than +/−40 to 50 nm single pass), excellent replication of the grooved structure >90% of stamper). In addition the terpolymer has low water uptake, a property that is critical for disk flatness. The terpolymer is also suitable for use in MO applications, including but not limited to, minidisks, 8× and 16× applications.

As discussed above, the terpolymer has properties suitable for use in high data storage density media, in particular DVD recordable media. The terpolymers of this invention preferably have glass transition temperatures in the range of 100° C. to 185° C., more preferably 125° to 165° C., even more preferably 130 to 150° C. The water absorption of the terpolymer is preferably below 0.33%, even more preferably less than about 0.2% at equilibrium. The IBR values of high data storage density media from the terpolymer are about −100 nanometers to about 100 nanometers; preferably about −50 nanometers to about 50 nanometers, even more preferably about −40 to about 40 nanometers.

The number average molecular weight (Mn) of the terpolymer, as determined by gel permeation chromatography relative to polystyrene, is preferably from about 10,000 to about 100,000, more preferably between about 10,000 to about 50,000, even more preferably between about 12,000 to about 40,000. The terpolymer preferably has a light transmittance of at least about 85%, more preferably at least about 90%.

The particular composition of the terpolymer may be adjusted depending on a number of factors including the end use of the blend and the desired properties of the blend. Residues of structure I preferably comprise from about 20 to about 80 mole % of the terpolymer; preferably from about 40 to about 60 mole % of the terpolymer, even more preferably about 40 to about 50 mole % of the terpolymer.

Representative units structure I include, but are not limited, to residues of 1,1-bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. Residues of BCC are most preferred as structural units I.

In one embodiment of the invention, the residues of structure (I) in the terpolymer consist of residues of BCC. BCC may be easily synthesized from cyclohexanone and ortho-cresol.

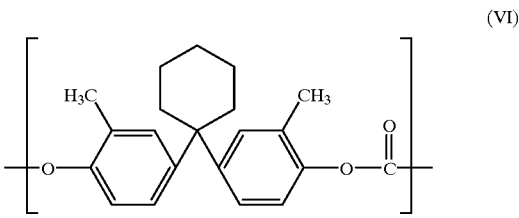

(VI)

In the present invention, it is critical that the structural units of formula (I) be substituted in the 3 or 3' position by at least one of $R_1$ or $R_2$. It is preferable that n and p are equal to one, and that $R_1$ and $R_2$ are present in the 3 and 3' positions, respectively. $R_1$ and $R_2$ are preferably $C_1$–$C_6$ alkyl, more preferably $C_1$–$C_3$ alkyl, even more preferably $CH_3$.

Residues of structure II preferably comprise from about 20 to about 80 mole % of the terpolymer; preferably from about 40 to about 60 mole % of the terpolymer. In one embodiment, the residues of structure (II) in the terpolymer consists of residues of BPA exclusively.

Representative units of structure II include, but are not limited to, residues of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl) propane; and mixtures thereof.

Residues of structure (V) preferably comprise from about 0.5 to about 10 mole % of the terpolymer; preferably from about 2 to about 7 mole % of the terpolymer. In one embodiment, the residues of structure (V) in the terpolymer consist of residues of dodecanedioc acid (DDDA)

Representative units of structure (V) include, but are not limited to, residues of dodecanedioic acid, sebacic acid, adipic acid, octadecanedioic acid, octadec-9-enedioic acid, 9-carboxyoctadecanoic acid and 10-carboxyoctadecanoic acid and mixtures thereof.

In one embodiment, the terpolymer comprises a) from about 40 to about 60 mole % of residues of BCC; more preferably from about 45 to 50 mole % of residues of BCC; b) from about 40 to 60 mole % of residues of BPA; more preferably from about 45 to 50 mole % of residues of BPA and c) from about 1 to about 10 mole % of residues of DDDA; more preferably from about 2 to about 10 mole % of residues of DDDA. In one embodiment the terpolymer consists of 47 mole % of residues of BCC, 47 mole % of residues of BPA and 6 mole % of residues of DDDA.

The terpolymer may be prepared by the interfacial or the melt process. If the interfacial process is used, the addition of various phase transfer catalysts is optional. Phase transfer catalysts which are suitable include, but are not limited to tertiary amines, such as triethylamine, ammonium salts, such as tetrabutylammonium bromide; or hexaethylguanidium chloride. Monofunctional phenols, such as p-cumylphenol and 4-butylphenol; long chain alkylphenols, such as cardanol and nonyl phenol; and difunctional phenols may be used as chain stopping agents. Optionally 0.1 to 10 mole %, more preferably 4 to 10 mole %, more preferably 4 to 7% of chainstopping agent may be incorporated into the first or second polycarbonate, based on the total moles of the repeating units.

In some instances, the phosgenation conditions must be adjusted. In particular, the phosgenation conditions should be adjusted in cases where the formation of undesired cyclic oligomers is favored by the characteristic reactivity of the monomer, which is related to monomer solubility in the reaction medium and monomer structure. In the case of BCC, for example, cyclic oligomer formation occurs to a greater extent under standard interfacial polymerization conditions than in the case of, for example, BPA. In polycarbonates containing substantial more than about 20 mol % of BCC, it is advantageous to use an excess of phosgene to promote the formation of linear bischloroformate oligomers which are converted to high molecular weight polymers by partial hydrolysis and polycondensation. Preferably from about 20 to 200 mol % of excess phosgene is used.

The polycarbonates as described may also be prepared by the melt or transesterification process. This process does not require the use of phosgene or a solvent and minimizes the formation of low molecular weight contaminants, such as cyclic and linear low molecular weight oligomers in the final polymer. The monomers are mixed with a carbonate source, such as a diarylcarbonate, and a small amount of catalyst, such as an alkali metal hydroxide or ammonium hydroxide and heated under a vacuum according to a protocol in which the temperature is raised through a series of stages while the pressure in the headspace over the reaction mixture is lowered from ambient pressure to about 1 torr.

Suitable carbonate sources, catalysts and reaction conditions are found in U.S. Pat. No. 5,880,248, and *Kirk-Othmer Encyclopedia of Chemical Technology*, Fourth Edition, Volume 19, pp. 585–600, herein incorporated by reference. The time of the stages and the temperature are such that mechanical losses of material through foaming and the like are avoided. Phenol and excess diphenyl carbonate are removed overhead to complete the polymerization process. The product high polymer is then isolated as a melt which may be compounded with other additives, such as stabilizers and mold release agents prior to pelletization. The products produced by the melt process have reduced numbers of undissolved particles and reduced content of low molecular weight contaminants, such as cyclic oligomers, relative to the interfacially produced product.

The terpolymer of the present invention may optionally be blended with any conventional additives used in optical applications, including but not limited to dyestuffs, UV stabilizers, antioxidants, heat stabilizers, and mold release agents, to form an optical article. In particular, it is preferable to form a blend of the polycarbonate and additives which aid in processing the blend to form the desired optical article. The blend may optionally comprise from 0.0001 to 10% by weight of the desired additives, more preferably from 0.0001 to 1.0% by weight of the desired additives.

Substances or additives which may be added to the polycarbonates of this invention, include, but are not limited to, heat-resistant stabilizer, UV absorber, mold-release agent, antistatic agent, slip agent, antiblocking agent, lubricant, anticlouding agent, coloring agent, natural oil, synthetic oil, wax, organic filler, inorganic filler and mixtures thereof. Suitable antistatic agents include distearylhydroxylamine, triphenyl amine, tri-n-octylphosphine oxide, triphenyl phosphine oxide, pyridine N-oxide, ethoxylated sorbitan monolaurate, and poly (alkylene glycol) compounds.

Examples of the aforementioned heat-resistant stabilizers, include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearoamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

The terpolymer may be a random copolymers, block copolymers or graft copolymers. When graft copolymers and other branched polymers are prepared a suitable branching agent is used during production.

The desired article, i.e. DVD recordable and rewritable media, may be obtained by molding the terpolymer by injection molding, compression molding, extrusion methods and solution casting methods. Injection molding is the more preferred method of forming the article.

Because the terpolymers of the present invention possess advantageous properties such as low water absorption, good processibility and low birefringence, they can be advantageously utilized to produce high density data storage media, such as DVD recordable materials.

In addition the terpolymer may be blended with a modifying polymer. Suitable modifying polymers are those which form miscible blends with the terpolymer. Possible modifying polymers include other polycarbonates, polyesters, polyamides, polystyrenes, polyurethanes, polyarylates, liquid crystalline polymers, vinyl polymers and the like, and mixtures thereof. Suitable modifying polymers may be determined by one of ordinary skill in the art by performing traditional miscibility tests with possible modifying polymers.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in ° C. or is at room temperature and pressure is at or near atmospheric.

The materials and testing procedures used for the results shown herein are as follows:

Molecular weights are reported as number average (Mn) and weight average (Mw) in units of grams/mole. Molecular weights were determined by gel permeation chromatography using an HP 1090 HPLC with two Polymer Labs Mixed Bed C columns at 35° C., a flowrate of 1 ml/min, using chloroform as solvent and a calibration based on polystyrene standards.

Water absorption (% $H_2O$) was determined by the following method which is similar to ASTM D570. The plastic part or disk was dried in a vacuum for over 1 week. The sample was removed periodically and weighed to determine if it was dry (stopped loosing mass). The sample was removed from the oven, allowed to equilibrate to room temperature in a dessicator, and the dry weight was recorded. The sample was immersed in a water bath at 23° C. The sample was removed periodically from the bath, the surface was blotted dry, and the weight recorded. This step was performed as quickly as possible so that this measurement time is small compared to the time between measurements. The sample was repeatedly immersed and the weight measured until the sample became substantially saturated. The sample was considered substantially saturated or at "equilibrium" when the increase in weight in a 2 week period averaged less than 1% of the total increase in weight (as described in ASTM method D-570-98 section 7.4

$T_g$ values were determined by differential scanning calorimetry using a PERKIN ELMER DSC7. The Tg was calculated based on the ½ Cp method using a heating ramp of 20° C./minute.

In the examples below, the percentages identified in the compositions are weight percentages, unless noted otherwise. "CS" indicates chainstopper and is in mol % paracumylphenol.

Viscosity values are in poise and measured at 350° C. at a shear rate of 1250 $sec^{-1}$ as measured on a rheometric dynamic spectrometer.

HDT is heat distortion temperature.

DMA turnover temperature is the temperature at which the storage modulus is 70% of platueau storage modulus as measured by torsional dynamic mechanical analysis.

The compositions in the following table are in mole %. For example 47/47/6 BCC/BPA/DDDA indicates a terpolymer of 47 mole % BCC, 47 mole % BPA, and 6 mole % DDDA, based on the repeat units in the polymer.

The following three procedures illustrate a method for preparation of the terpolymer.

Procedure 1

Preparation of BCC/BPA/DDDA (47/47/6) Terpolyestercarbonatecarbonate

A 100 L phosgenator was charged with BCC (6563 g, 22.2 mol), BPA (5052 g, 22.2 mol), DDDA (651 g, 2.83 mol), methylene chloride (42 L), distilled water (42 L), p-cumylphenol (600 g, 2.83 mol, 6.0 mol %), triethylamine (89 mL, 1.35 mol %) and methyltributylammonium chloride (1067 mL of a 33 wt % aqueous solution, 3.18 mol %). Sodium hydroxide (500 g of a 50 wt % aqueous solution) was added and the reaction mixed for 5 minutes. Phosgene (3273 g, 33.1 mol, 70 mol % equivalence) was added at 125 g/min maintaining the pH at 8.5 by the addition of the NaOH solution. The pH was ramped to 10.5 over 1.5 minutes and phosgene continued until 6087 g (61.5 mol, 30 mol % excess) had been added. The polymer solution was diluted with methylene chloride (35 L), separated from the brine, washed two times with 1N HCl and six times with distilled water. The polymer was isolated by steam precipitation and dried overnight at 120° C. under nitrogen. The dried polymer had a Tg of 127° C. and a Mw of 18,200 (polycarbonate standards).

Procedure 2

Preparation of BCC/BPA/DDDA (48/48/4) Terpolyestercarbonatecarbonate

A 100 L phosgenator was charged with BCC (6710 g, 22.7 mol), BPA (4169 g, 22.7 mol), DDDA (435 g, 1.89 mol), methylene chloride (42 L), distilled water (42 L), p-cumylphenol (575 g, 2.71 mol, 5.75 mol %), triethylamine (89 mL, 1.35 mol %) and methyltributylammonium chloride (1067 mL of a 33 wt % aqueous solution, 3.18 mol %). Sodium hydroxide (500 g of a 50 wt % aqueous solution) was added and the reaction mixed for 5 minutes. Phosgene (3273 g, 33.1 mol, 70 mol % equivalence) was added at 125 g/min maintaining the pH at 8.5 by the addition of the NaOH solution. The pH was ramped to 10.5 over 1.5 minutes and phosgene continued until 6087 g (61.5 mol, 30 mol % excess) had been added. The polymer solution was diluted with methylene chloride (35 L), separated from the brine, washed two times with 1N HCl and six times with distilled water. The polymer was isolated by steam precipitation and dried overnight at 120° C. under nitrogen. The dried polymer had a Tg of 129° C. and a Mw of 18,300 (polycarbonate standards).

Procedure 3

BCC/BPA/DDDA (49/49/2) Terpolyestercarbonatecarbonate

A 100 L phosgenator was charged with BCC (6850 g, 23.1 mol), BPA (5277 g, 23.1 mol), DDDA (217 g, 0.94 mol), methylene chloride (42 L), distilled water (42 L), p-cumylphenol (625 g, 2.95 mol, 6.25 mol %), triethylamine (89 mL, 1.35 mol %) and methyltributylammonium chloride (1067 mL of a 33 wt % aqueous solution, 3.18 mol %). Sodium hydroxide (500 g of a 50 wt % aqueous solution) was added and the reaction mixed for 5 minutes. Phosgene (3273 g, 33.1 mol, 70 mol % equivalence) was added at 125 g/min maintaining the pH at 8.5 by the addition of the NaOH solution. The pH was ramped to 10.5 over 1.5 minutes and phosgene continued until 6087 g (61.5 mol, 30 mol % excess) had been added. The polymer solution was diluted with methylene chloride (35 L), separated from the brine, washed two times with 1N HCl and six times with distilled water. The polymer was isolated by steam precipitation and dried overnight at 120° C. under nitrogen. The dried polymer had a Tg of 132° C. and a Mw of 17,000 (polycarbonate standards).

TABLE 1

| Example | Material (mol %) | % PCP Chain-stopper | MW (PC) gm/mol | Viscosity (Poise) @ 350 C., 1250 $sec^{-1}$ | Tg (C.) | DMA turnover Temp (C.) | HDT (C.) | % H2O Equilibrium Absorption |
|---------|------------------|---------------------|----------------|---------------------------------------------|---------|------------------------|----------|------------------------------|
| 1 | BPA-PC | 6% | 17,500 | 260.16 | 142 | 140 | 126.5 | 0.37 |
| 2 | BPA-DDDA (92/8) |  | 19102 | 130.2 | 122 | 115 | 105.2 |  |
| 3 | BCC/BPA/DDDA 47/47/6 | 5.25% | 19,729 | 198.22 | 126.2 | 122 | 111.3 | 0.24 |
| 4 | BCC/BPA/DDDA 47/47/6 | 6.25% | 17,467 | 104.41 | 125.9 | 122 | 108.3 | 0.26 |
| 5 | BCC/BPA/DDDA 48/48/4 | 5.75% | 18,295 |  | 129 | 127 | 114 | 0.26 |
| 6 | BCC/BPA/DDDA 49/49/2 | 5.25% | 19,158 | 214.83 | 133.6 | 134 | 118 | 0.27 |
| 7 | BCC/BPA/DDDA 49/49/2 | 6.25% | 17,067 | 141.64 | 131.2 | 130 | 116 | 0.27 |
| 8 | BCC |  | 18,036 | 320 | 138 | 123 | 117.3 | 0.22 |

The materials prepared above were molded on the NET-STALL DISKJET 600, DVD mold (0.6 mm thickness mold) and a DVD+RW stamper with nominal groove depth of 40 nm. An experiment was designed, varying the mold, melt temperatures. Representative results of unmetalized, unbonded single substrates are set forth in Table 2. The birefringence was measured by a DR. SCHENK PROMETEUS optical disk tester. The groove depths on the DVD substrates were measured at three radial locations (28 mm, 38 mm and 53 mm) by AFM (atomic force microscopy) and averaged, and compared to the stamper groove depth.

TABLE II

| Example | Material | % PCP Chain-Stopper | Melt/Mold Temp (C.) | Avg Groove Depth (nm) | % Replication | Biref. MIN (nm) | Biref. MAX (nm) |
|---|---|---|---|---|---|---|---|
| 9 | BCC/BPA/DDDA 47/47/6 | 6.25% CS | 350/100 | 36.87 | 92.17 | 5.4 | 36.8 |
| 10 | BCC/BPA/DDDA 47/47/6 | 6.25% CS | 370/100 | 37.07 | 92.67 | 3.8 | 40.2 |
| 11 | BCC/BPA/DDDA 47/47/6 | 5.25% CS | 350/100 | 38.13 | 95.33 | 3.2 | 31.2 |
| 12 | BCC/BPA/DDDA 47/47/6 | 5.25% CS | 370/100 | 39.67 | 99.17 | 2.4 | 24.4 |
| 13 | BCC/BPA/DDDA 48/48/4 | 5.75% CS | 350/100 | 39.13 | 97.83 | −1 | 26.4 |
| 14 | BCC/BPA/DDDA 48/48/4 | 5.75% CS | 350/115 | 37.57 | 93.92 | −1.8 | 44.6 |
| 15 | BCC/BPA/DDDA 48/48/4 | 5.75% CS | 370/100 | 38.17 | 95.42 | −2.4 | 18.4 |
| 16 | BCC/BPA/DDDA 48/48/4 | 5.75% CS | 370/115 | 40.53 | 101.33 | −12 | 51.4 |
| 17 | BCC/BPA/DDDA 49/49/2 | 6.25% CS | 350/100 | 36.50 | 91.25 | −4.2 | 23.6 |
| 18 | BCC/BPA/DDDA 49/49/2 | 6.25% CS | 350/115 | 36.90 | 92.25 | −3.8 | 38.6 |
| 19 | BCC/BPA/DDDA 49/49/2 | 6.25% CS | 370/100 | 38.53 | 96.33 | −5 | 18 |
| 20 | BCC/BPA/DDDA 49/49/2 | 6.25% CS | 370/115 | 46.37 | 115.92 | −9.8 | 40.8 |
| 21 | BCC/BPA/DDDA 49/49/2 | 5.25% CS | 350/100 | 34.37 | 85.92 | −7.4 | 46 |
| 22 | BCC/BPA/DDDA 49/49/2 | 5.25% CS | 350/115 | 39.60 | 99.00 | 4.2 | 41.2 |
| 23 | BCC/BPA/DDDA 49/49/2 | 5.25% CS | 370/100 | 34.53 | 86.33 | −2.2 | 34.6 |
| 24 | BCC/BPA/DDDA 49/49/2 | 5.25% CS | 370/115 | 38.03 | 95.08 | 3.8 | 31 |
| 25 | BPA-PC | 6% CS | 350/100 | 13.20 | 33.00 | −5 | 39 |
| 26 | BPA-PC | 6% CS | 350/115 | 39.40 | 98.50 | 1.2 | 32.2 |
| 27 | BPA-PC | 6% CS | 370/100 | 18.00 | 45.00 | −4.8 | 37 |
| 28 | BPA-PC | 6% CS | 370/115 | 36.97 | 92.42 | 0.6 | 28.8 |

As shown in Table II, the terpolymer compositions of the present invention replicate substantially better than BPA polycarbonate, especially at the higher DDDA compositions. In addition, the IBR values are as good, and generally better than those for BPA polycarbonate.

It is desirable to have mold temperatures below about 110° C. to minimize cycle time, also lower melt temperatures gives better tilt performance, i.e flatter disks.

The invention has been described in detail with particular reference to preferred embodiments thereof, but it will be understood that variations and modifications can be effected within the spirit and scope of the invention.

What is claimed is:

1. A high density data storage media comprising a terpolymer, the terpolymer comprising A) carbonate structural units corresponding to structure (I)

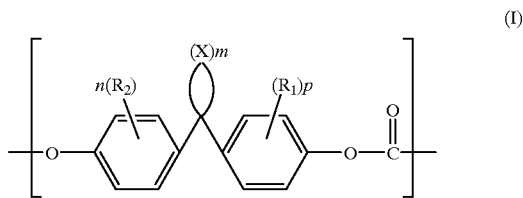

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from about 20 to about 80 mole % of the terpolymer;

B) carbonate structural units corresponding to structure (II)

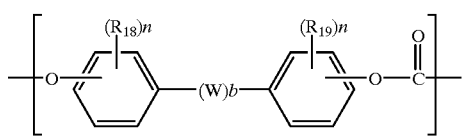

where
R$_{18}$ is independently selected from the group consisting of halogen, hydrogen, monovalent C$_1$–C$_6$ hydrocarbon, monovalent C$_1$–C$_6$ hydrocarbonoxy radicals,
R$_{19}$ is independently selected from the group consisting of halogen, hydrogen, monovalent C$_1$–C$_6$ hydrocarbon, and monovalent C$_1$–C$_6$ hydrocarbonoxy radicals;
W is selected from the group consisting of substituted or unsubstituted divalent C$_1$–C$_{18}$ hydrocarbon radicals, —S—, —S—S—, —O—,

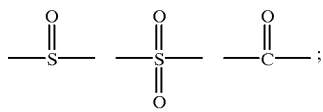

each n is independently selected from integers having a value of from 0 to 4 inclusive; and b is zero or one; wherein the structural units (II) comprise from about 20 to about 80 mole % of the terpolymer; and
C) structural units corresponding to structure (V)

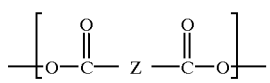

wherein Z is a C$_1$–C$_{40}$ branched or unbranched alkyl or branched or unbranched cycloalkyl and wherein the structural units of formula (V) comprise from about 0.5 to about 10 mole % of the terpolymer.

2. The high density data storage media of claim 1, wherein the terpolymer has a water absorption below about 0.33%, and a Tg of from about 120° C. to about 185° C.

3. The high density data storage media of claim 1, wherein component A) has the structure:

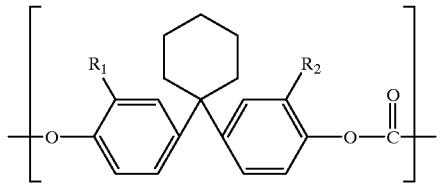

where
R$_1$ and R$_2$ are CH$_3$.

4. The high density data storage media of claim 1, wherein component B) comprises residues of BPA and component C) comprises residues of DDDA.

5. A digital versatile disk comprising a terpolymer, the terpolymer comprising
a) a residue of 1,1-bis(4-hydroxy-3-methylphenyl) cyclohexane (BCC); 1,1-bis(4-hydroxy-3-methylphenyl)cyclopentane; 1,1-bis(4-hydroxy-3-methylphenyl)cycloheptane or a mixture thereof;

b) a residue of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; or a mixture thereof; and c) a residue of dodecanedioic acid, sebacic acid, adipic acid, octadecanedioic acid, octadec-9-enedioic acid, 9-carboxyoctadecanoic acid and 10-carboxyoctadecanoic acid or a mixture thereof;

the terpolymer having a Tg from about 120° C. to about 185° C. and a water absorption of below about 0.33%, and the digital versatile disk having an IBR in the range of about –100 nanometers to about 100 nanometers.

6. The digital versatile disk of claim 5 having an IBR in the range of about –40 to about 40 nanometers.

7. A high density data storage media comprising:
1) a data layer, and
2) a transparent overlayer adjacent to the data layer,
wherein the transparent overlayer has a thickness of less than about 0.6 mm, and said transparent overlayer comprises a terpolymer, the terpolymer comprising
A) carbonate structural units corresponding to structure (I)

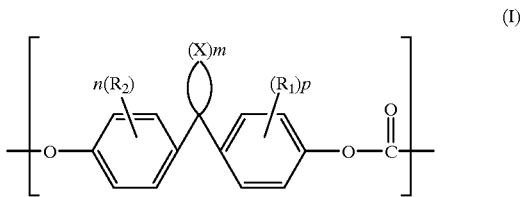

where
R$_1$ and R$_2$ are independently selected from the group consisting of C$_1$–C$_6$ alkyl;
X represents CH$_2$;
m is an integer from 4 to 7;
n is an integer from 1 to 4; and
p is an integer from 1 to 4
with the proviso that at least one of R$_1$ or R$_2$ is in the 3 or 3' position; and wherein the structural units of formula (I) comprise from about 20 to about 80 mole % of the terpolymer;
B) carbonate structural units corresponding to structure (II)

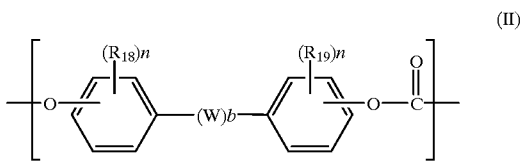

where
R$_{18}$ is independently selected from the group consisting of halogen, hydrogen, monovalent C$_1$–C$_6$ hydrocarbon, monovalent C$_1$–C$_6$ hydrocarbonoxy radicals,
R$_{19}$ is independently selected from the group consisting of halogen, hydrogen, monovalent C$_1$–C$_6$ hydrocarbon, and monovalent C$_1$–C$_6$ hydrocarbonoxy radicals;
W is selected from the group consisting of substituted or unsubstituted divalent C$_1$–C$_{18}$ hydrocarbon radicals,

—S—, —S—S—, —O—,

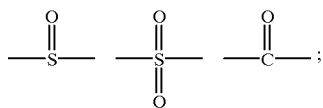

each n is independently selected from integers having a value of from 0 to 4 inclusive; and b is zero or one; wherein the structural units (II) comprise from about 20 to about 80 mole % of the terpolymer; and C) structural units corresponding to structure (V)

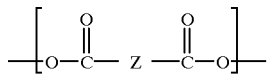

(V)

wherein Z is a $C_1$–$C_{40}$ branched or unbranched alkyl or branched or unbranched cycloalkyl and wherein the structural units of formula (V) comprise from about 0.5 to about 10 mole % of the terpolymer.

8. The high density data storage media of claim 7, wherein the high density data storage media is DVD-RW; DVD+RW; DVD-RAM or write once DVD recordable material.

9. The high density data storage media of claim 7, wherein component A) comprises a residue of BCC; component B) comprises a residue of BPA; and component C) comprises a residue of DDDA.

10. A high density data storage media comprising a terpolymer, the terpolymer comprising
    a) a residue of BCC;
    b) a residue of BPA; and
    c) a residue of DDDA.

11. The high density data storage media of claim 9, wherein the data storage media is a DVD.

* * * * *

UNITED STATES PATENT AND TRADEMARK OFFICE
CERTIFICATE OF CORRECTION

PATENT NO.    : 6,395,364 B1
DATED         : May 28, 2002
INVENTOR(S)   : Gary Charles Davis et al.

It is certified that error appears in the above-identified patent and that said Letters Patent is hereby corrected as shown below:

Column 11,
Line 44, replace "triethylarine" with -- trimethylamine --
Line 28, replace "platueau" with -- plateau --

Signed and Sealed this

Twenty-seventh Day of July, 2004

JON W. DUDAS
*Acting Director of the United States Patent and Trademark Office*